(12) United States Patent
Yu et al.

(10) Patent No.: US 8,655,545 B2
(45) Date of Patent: Feb. 18, 2014

(54) VEHICLE GRILLE SHUTTER SYSTEM AND METHOD OF ITS USE

(75) Inventors: Songping Yu, Troy, MI (US); Bryon Wasacz, South Lyon, MI (US); Michael Prucka, Ann Arbor, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 636 days.

(21) Appl. No.: 12/785,862

(22) Filed: May 24, 2010

(65) Prior Publication Data

US 2011/0288717 A1    Nov. 24, 2011

(51) Int. Cl.
*G06F 7/00* (2006.01)
*G01M 17/00* (2006.01)
*G06F 19/00* (2011.01)
*G07C 5/00* (2006.01)

(52) U.S. Cl.
USPC .......................... 701/36; 701/29.1; 701/34.4

(58) Field of Classification Search
USPC ............. 454/75; 701/49, 31.4, 29.1, 34.4, 36; 123/41.01, 41.04, 41.05, 41.58; 165/271
IPC ....................................................... B60H 1/26
See application file for complete search history.

(56) References Cited

U.S. PATENT DOCUMENTS

| 3,845,700 | A | | 11/1974 | Lefeuvre | |
|---|---|---|---|---|---|
| 4,779,577 | A | * | 10/1988 | Ritter et al. | 123/41.05 |
| 5,901,786 | A | * | 5/1999 | Patel et al. | 165/283 |
| 6,079,536 | A | * | 6/2000 | Hummel et al. | 192/58.62 |
| 6,666,176 | B2 | * | 12/2003 | Shinpo et al. | 123/41.1 |
| 7,182,047 | B1 | * | 2/2007 | Schwartz | 123/41.04 |
| 8,256,387 | B2 | * | 9/2012 | Taylor | 123/41.05 |
| 8,302,715 | B2 | * | 11/2012 | Lee et al. | 180/68.1 |
| 2003/0141050 | A1 | * | 7/2003 | Brocksopp | 165/299 |
| 2006/0095178 | A1 | * | 5/2006 | Guilfoyle et al. | 701/36 |
| 2006/0267376 | A1 | | 11/2006 | Mcknight et al. | |
| 2009/0050385 | A1 | * | 2/2009 | Guilfoyle et al. | 180/68.1 |
| 2010/0139583 | A1 | * | 6/2010 | Klotz et al. | 123/41.04 |
| 2011/0137530 | A1 | * | 6/2011 | Kerns | 701/49 |

FOREIGN PATENT DOCUMENTS

| DE | 102005034775 A | 11/2006 |
|---|---|---|
| DE | 102006021173 A | 11/2007 |
| DE | 102007062591 A | 7/2009 |
| EP | 2172357 A | 4/2010 |
| FR | 1 387 449 | 3/1975 |
| GB | 2 179 133 A | 2/1987 |
| WO | WO 01/46570 A1 | 6/2001 |

OTHER PUBLICATIONS

Clarence W. De Silva, Vibration: Fundamentals and Practice, 2007, CRC Press, p. 563.*
European Office Action for European Application No. 11724852.6 dated Jan. 8, 2013.
International Search Report and Written Opinion for PCT/US2011/037523 dated Oct. 19, 2011.

* cited by examiner

*Primary Examiner* — Fadey S Jabr
*Assistant Examiner* — Lail Kleinman
(74) *Attorney, Agent, or Firm* — Ralph E. Smith (57) ABSTRACT

A vehicle system includes a first sensor that provides first data indicating at least one of vehicle speed and ambient temperature. The system also includes a shutter control module. The shutter control module includes a first sub-module that provides a first amount of modification to an opening amount for a shutter based on the first data.

15 Claims, 4 Drawing Sheets

VEHICLE GRILLE SHUTTER SYSTEM AND METHOD OF ITS USE

FIELD

The present invention relates to grille shutters for vehicles and more specifically relates to aiding in thermal management of vehicle systems via control of grille shutters.

BACKGROUND

Automotive vehicles typically have a radiator for cooling the engine. The radiator is commonly situated behind a grille. The grille permits air to flow therethrough and to the radiator to aid in cooling the engine. More specifically, vehicle grilles allow the flow of air to contact and cool the radiator fins, which in turn cool the radiator fluid that cools the engine.

As vehicle velocity increases, the amount of airflow through the grille and into the engine compartment increases, which slows the vehicle and makes the engine work harder. The additional airflow through the grill at higher vehicle speeds is also detrimental to fuel economy. As vehicle velocity increases, the amount of vehicle aerodynamic drag increases as a result of the increased airflow into the engine compartment through the grille. As aerodynamic drag increases, more energy is required to move the vehicle.

SUMMARY

A vehicle system includes a first sensor that provides first data indicating at least one of vehicle speed and ambient temperature. The system also includes a shutter control module. The shutter control module includes a first sub-module that provides a first amount of modification to an opening amount for a shutter based on the first data.

The system also comprises a second sensor that provides the second data indicating a first vehicle component condition. The shutter control module also comprises a second sub-module that provides a second amount of modification to the opening amount for the shutter based on the second data. The shutter control module determines the opening amount for the shutter based on the first amount of modification and the second amount of modification.

In other features, the first sub-module comprises a first request table that provides the first amount of modification to the opening amount for the shutter based on the vehicle speed. The shutter control module further comprises a third sub-module that provides a third amount of modification to the opening amount for the shutter based on the ambient temperature. The shutter control module combines the first amount of modification and the third amount of modification to provide a first combined amount of modification to the opening amount. The shutter control module combines the first combined amount with the second amount of modification to provide a second combined amount of modification to the opening amount.

In other features, the system comprises a third sensor that provides third data that indicates fan speed. The shutter control module further comprises a fourth sub-module that provides a fourth amount of modification to the opening amount for the shutter based on the fan speed. The vehicle system further comprises a selection module that selects a maximum value from between the fourth amount of modification and the second combined amount. The shutter control module controls the opening amount of the shutter based on the maximum value. The vehicle component condition comprises at least one of actual engine temperature, actual transmission oil temperature, actual air conditioning head pressure, actual engine speed, actual engine torque and actual fan speed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

As used herein, the term module refers to components, devices and systems that are electric and/or mechanical that provide signals, instructions, and/or activate other vehicle components and systems. Modules can include all those functions listed above. Further, a module may be an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure is directed to a vehicle grille shutter system that receives data from one or more sensors. The data is used by the vehicle system to influence opening and closing of a grille shutter. In one embodiment, the data is weighted so that some data influences the opening and closing of the grille shutter more than other data. In some embodiments data is combined where the data from one or more sensors and modules is manipulated to influence the combination output used to modify shutter opening. Manipulation may include selection of certain data based on predetermined criteria and mathematical processes to influence the combination output used to modify shutter opening.

In one embodiment, the data is processed through tables within sub-control modules of the vehicle system. The outputs of the sub-control modules are then used to influence opening and closing of a grille shutter. In an some embodiments, maximum values are selected from outputs of two or more of the sub-control modules, and the maximum values are used to influence opening and closing of a grille shutter.

Further, the opening and closing of a grille shutter can be controlled to optimize vehicle component operation and improve fuel economy. For example, when vehicle engine components can tolerate certain operational temperatures, and operate at a low fan speed without additional air cooling, the vehicle system may close the grille shutter for a predetermined amount of time.

Generally, however, the vehicle system attempts to maintain the vehicle engine temperature at a predetermined optimal value for engine efficiency. When the actual value of engine temperature is below the predetermined optimal value, closing the grille shutter reduces cooling of the engine and raises engine temperature. When the actual value of engine temperature is above the predetermined optimal value, opening the grille shutter reduces heat of the engine and lowers engine temperature. In this embodiment, an engine cooling fan may or may not be engaged, as controlling the grille shutter opening may be sufficient to heat or cool the engine. In other words, control of the grille shutter may used to aid in the thermal management of the engine environment.

In an exemplary embodiment, the vehicle system operates in response to activation of ignition (i.e. a key-on procedure). The vehicle system may continuously monitor the sensor data and/or other vehicle data and continuously control the grille shutter. The vehicle system may also operate following a key-off procedure. In this embodiment, sensor data may be used to open or close the grille shutter following the key-off procedure. For example, at a key-off procedure the shutter may be opened or closed to maintain a temperature of vehicle systems or components above or below an external ambient temperature.

Figure 1:
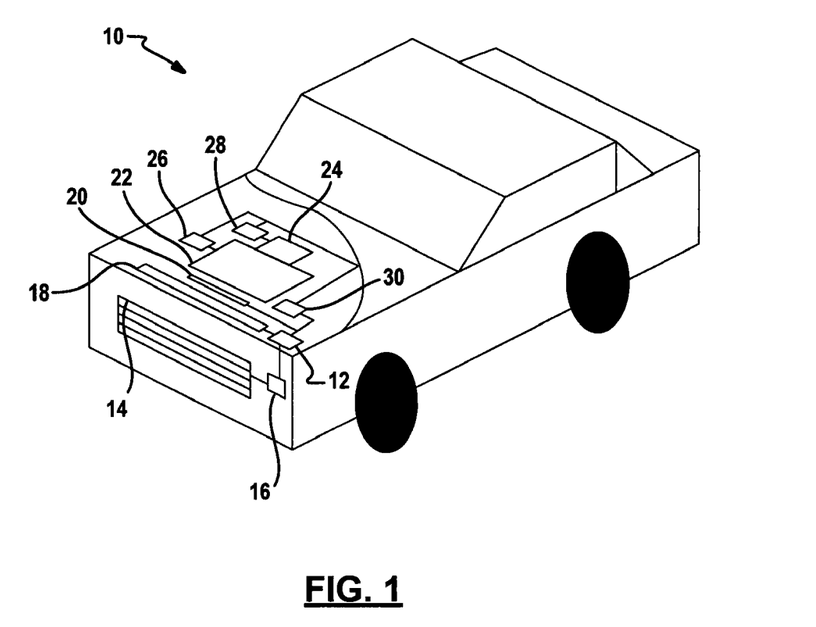
FIG. 1 is a partial cutaway view of a vehicle system, according to the present disclosure.

Referring now to FIG. 1, a partial cutaway view of a vehicle system 10 is illustrated in an exemplary embodiment. The system 10 includes a shutter control module 12 that controls opening and closing of a shutter 14 via an actuator 16. The shutter 14 promotes cooling of various vehicle components when open due to airflow therethrough. The system 10 also includes a radiator 18, a cooling fan 20, an engine 22 and a transmission 24. An engine control module 26 controls functions of the engine 22, and a transmission control module 28 controls functions of the transmission 24. The system 10 also includes an air conditioning control module 30. The system 10 also includes various sensors that obtain data of the conditions of various vehicle components.

Figure 2A:
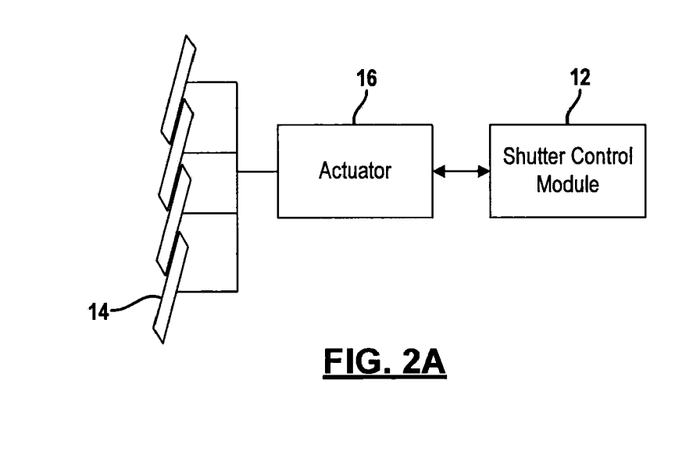
FIGS. 2A-2C illustrate opening and closing states of a vehicle shutter, according to the present disclosure.
Figure 2B:
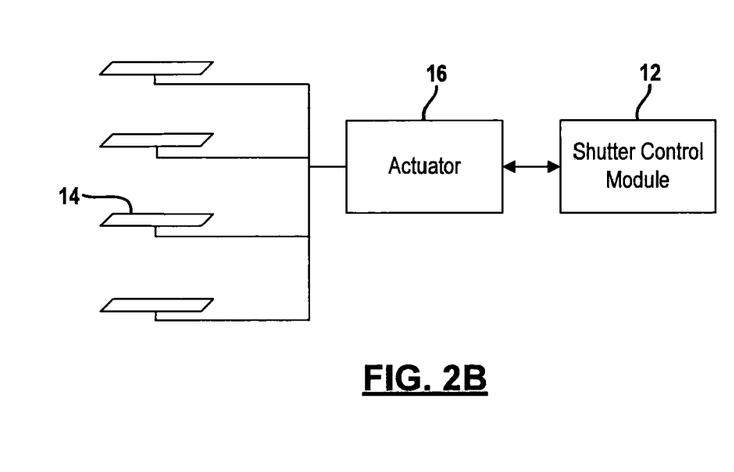
Figure 2C:
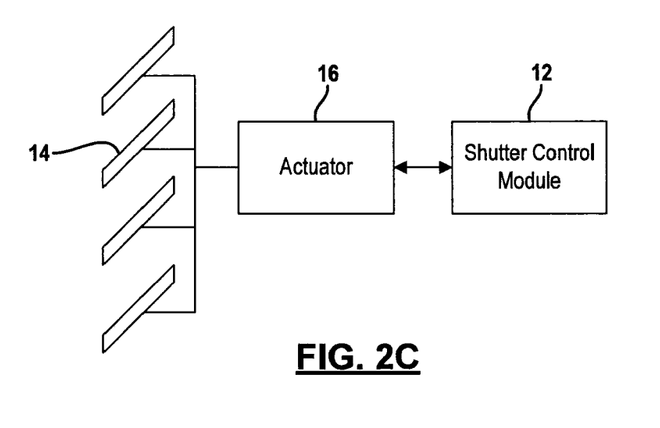

Referring now to FIGS. 2A-2C, examples of opening and closing states of the shutter 14 are illustrated. The shutter control module 12 commands the actuator 16 to open and close the shutter 14 by various amounts. In FIG. 2A the shutter 14 is completely closed, e.g. 0 percent open. In FIG. 2B the shutter 14 is completely open, e.g. 100 percent open. In FIG. 2C the shutter 14 is partially open. Partially open may include any amount from greater than 0 percent open to less than 100 percent open. For example, a 50 percent open shutter 14 indicates that the shutter 14 is partially open.

Figure 3:
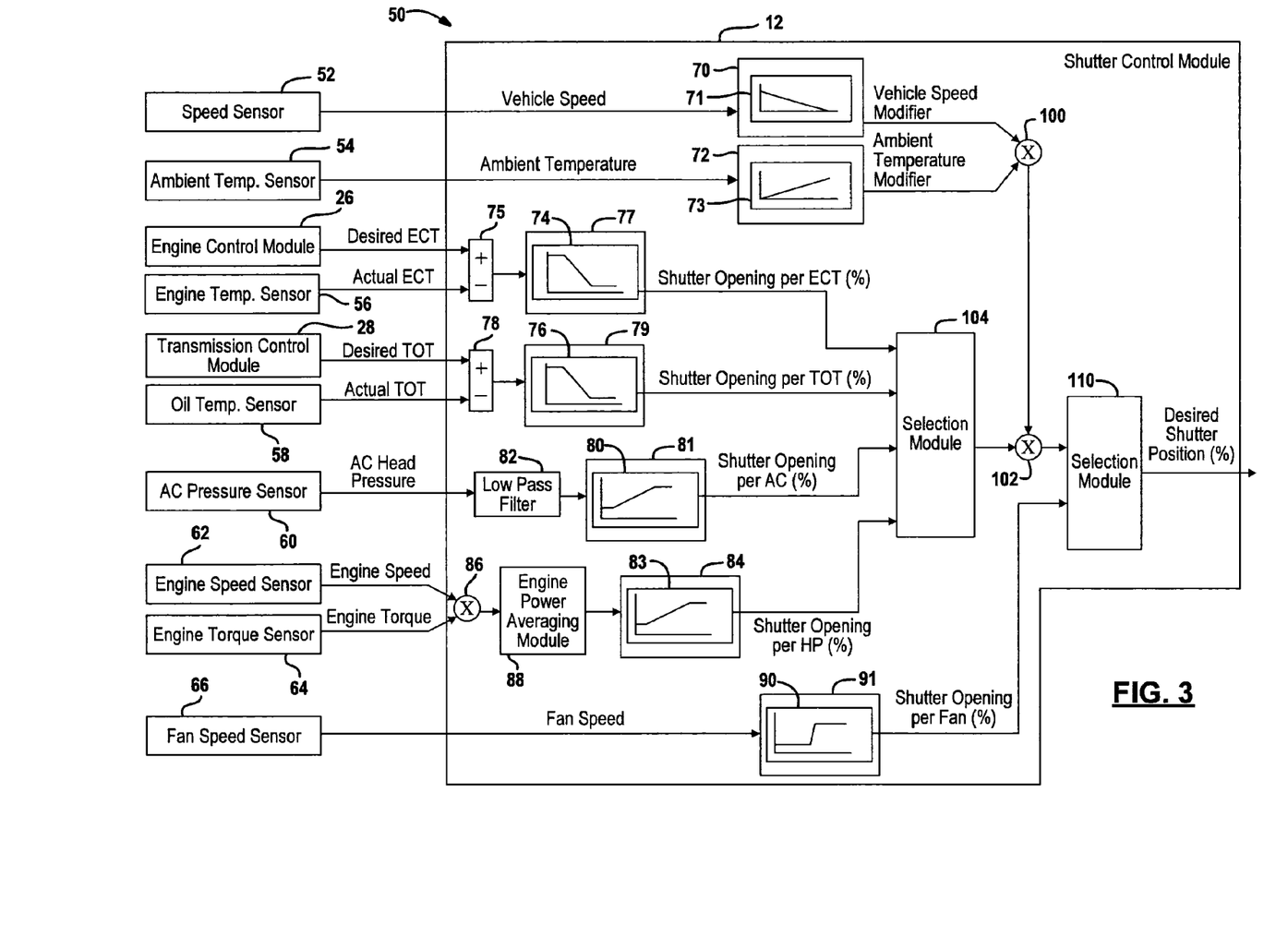
FIG. 3 is a shutter control system, according to the present disclosure.

Referring now to FIG. 3, a shutter control system 50 is illustrated. The system 50 includes the shutter control module 12 and various sensors that obtain data of the different aspects of the vehicle system 10 and different conditions that the vehicle system 10 is experiencing. For example, the sensors include a speed sensor 52, an ambient temperature sensor 54, an engine temperature sensor 56, an oil temperature sensor 58, an air conditioning (AC) pressure sensor 60, and engine speed sensor 62, an engine torque sensor 64, and a fan speed sensor 66. Various other sensors may also be included, such as an engine oil temperature sensor (not shown) and an exhaust gas temperature sensor (not shown), to gain additional information about vehicle temperature conditions. The configuration of the sensors may include be electric or mechanical sensing devices and/or software functional estimators, and combinations thereof.

The shutter control module 12 controls operation of the shutter 14 in response to input from one or more sensors or systems of the vehicle. For example, the shutter control module 12 controls the shutter 14 based on input from the sensors and inputs from the engine control module 26 and the transmission control module 28.

The speed sensor 52 provides data about the vehicle speed. The ambient temperature sensor 54 provides data about the ambient temperature inside the engine compartment. In another embodiment, the sensor 54 or another sensor provides data of the ambient temperature external to the vehicle system 10. The engine temperature sensor 56 provides data about the temperature of the engine. The oil temperature sensor 58 provides data about the transmission oil temperature. The AC pressure sensor 60 provides data about the AC head pressure. The engine speed sensor 62 provides data about the engine speed. The engine torque sensor 64 provides data about the engine torque. The fan speed sensor 66 provides data about the speed of the fan 20. Values of the various sensor outputs may be referred to herein as actual values. For example, the engine temperature sensor outputs the engine temperature, which may be referred to as actual engine temperature.

In one exemplary embodiment, the shutter control module 12 receives the outputs from one or more sensors and of the engine and transmission control modules 26, 28 and generates a signal to actuate the shutter 14 to a desired opening amount or closed position. The desired shutter position may include a percentage value for opening, also referred to as an amount of opening, for the shutter 14. The percentage value indicates how open the shutter 14 is, as discussed herein above. For example, 0 percent opening corresponds to a closed shutter; and 100 percent corresponds to a completely open shutter. In one embodiment, a desired shutter position modification amount indicates how much the shutter 14 should be opened or closed relative to its current opening amount. Alternatively, the desired shutter position modification amount indicates an amount of opening for the shutter 14 regardless of the shutter's current opening amount. That is, the modification amount may indicate a set percentage amount that the shutter is to be opened.

In one embodiment, the shutter control module 12 generates a signal to activate the shutter 14 to an opening amount in response to a selection among openings listed in a request table (e.g. look-up table) corresponding to one or more vehicle component or system conditions. In an alternative embodiment, the request tables are stored in memory (not shown) external to the shutter control module 12. In an embodiment each of the request tables includes a specific output shutter opening value for a respective input value from one or more of the sensors and/or modules. The output values may be predetermined, and functions within the request tables may be predetermined. In another embodiment one or more of the output shutter values in the request tables may be determined through use of an algorithm based on one or more sensor data.

The functions may be linear, non-linear and/or segmented. In one embodiment illustrated in FIG. 3, the y-axis of the request tables corresponds to shutter opening percentage values or modification scalar values. In other words, the y-axis corresponds to amounts of modification relative to the amount the shutter is currently opened. The modification amounts may modify the amount the shutter is opened so that the shutter 14 is more opened or more closed, or the modification amounts may set a percentage opening value for the shutter 14. The x-axis corresponds to the sensor(s) data (i.e. data for various vehicle devices, such as the engine control module). Each of the request tables may be controlled, updated and implemented by a respective sub-control module within the shutter control module 12.

For example, a vehicle speed sub-control module 70 receives vehicle speed data from the vehicle speed sensor 52 and outputs a corresponding modification amount for the opening amount of the shutter 14. The vehicle speed sub-control module 70 runs an algorithm including processing sensor data through a vehicle speed request table 71 to provide the corresponding modification amount for the opening amount of the shutter 14. An ambient temperature sub-control module 72 receives the ambient temperature from the ambient temperature sensor 54 and outputs a corresponding modification amount to the opening amount of the shutter 14. The ambient temperature sub-control module 72 runs an algorithm including processing sensor data through an ambient temperature request table 73 to provide the corresponding modification amount for the opening amount of the shutter 14. The ambient temperature is sensed either within the vehicle or external to the vehicle.

In one embodiment, the vehicle speed request table 71 includes a linearly decreasing function, and the ambient temperature request table 73 for the ambient temperature includes a linearly increasing function. In other words, for increasing values of vehicle speed, the modification amount for opening of the shutter decreases. For increasing values of ambient temperature, the modification amount for opening of the shutter increases.

Some of the request tables may include non-linear or partially linear functions. Further, some of the request tables receive desired and actual values for various vehicle conditions. For example, an engine temperature sub-control module 77 receives a desired engine temperature from the engine control module 26 and an actual engine temperature from the engine temperature sensor 56. The engine temperature sub-control module 77 runs an algorithm including processing data through an engine temperature request table 74 to provide a corresponding modification amount for the opening amount of the shutter 14.

The difference between the desired and actual engine temperatures is calculated in combination module 75. The engine temperature sub-control module 77 outputs a modification amount for the shutter opening amount that corresponds to the difference between desired and actual engine temperatures.

One embodiment of the engine temperature request table 74 includes a function that, where if the difference between desired and actual engine temperature is higher or close to the desired engine temperature, the modification amount may be determined to be at or close to 100 percent open for effective cooling. At midrange values of the difference between desired and actual temperatures, the shutter open amount corresponds to a linearly decreasing function. And where the difference between desired and actual engine temperatures is below the desired engine temperature, the modification amount may be determined to be 0 percent open or close to 0 percent open in order to help raise engine temperature to improve engine operation efficiency. Again, the modification amount may indicate that the shutter is to be placed in the 0 percent open or close to 0 percent open position. The modification amount may also indicate amount of adjustment for the shutter relative to the shutter's current position to reach the 0 percent open or close to 0 percent open position or to some partial opening amount.

Likewise, a transmission oil temperature request table 76 within a transmission oil temperature sub-control module 79 may have a similar function as the engine temperature request table 74. The transmission oil temperature sub-control module 79 utilizes the transmission oil temperature request table 76, and a desired transmission oil temperature from the transmission control module 28, and an actual transmission temperature from the oil temperature sensor 58. The difference between desired and actual transmission oil temperatures is determined in a combination module 78 and then input to the transmission oil temperature sub-control module 79. The transmission oil temperature sub-control module 79 outputs a modification amount based on the transmission oil temperature and corresponding to the function within the transmission oil temperature request table 76.

Other request tables may include different functions. For example, the air conditioning request table 80 for the air conditioning system within air conditioning sub-control module 81 includes a function that, at lower values of the AC head pressure, outputs an almost closed shutter modification amount. In other words, an almost closed modification amount brings the shutter 14 from its current position to near closed, such as 10% open. Almost closed may also correspond to near to or at 0 percent open. At midrange values of the AC head pressure, the air conditioning system request table 80 includes a linearly increasing function. And at higher values of the AC head pressure, the air conditioning system request table 80 outputs an almost completely open shutter modification amount or alternatively a completely open (e.g. 100 percent) shutter modification amount. In one embodiment, the AC head pressure from the AC pressure sensor 60 consists of some undesirable high frequency components. Therefore, a low pass filter 82 is included to filter the AC head pressure value prior to input into the air conditioning system sub-control module 81.

In one embodiment, engine speed from the engine speed sensor 62 and engine torque from the engine torque sensor 64 are multiplied together by a combination module 86 to estimate the engine output power. An averaging module 88 averages the value of the calculated engine output power over time. The engine speed or engine torque sub-control module 84 utilizes that average value with the engine speed or engine torque request table 83 to determine a shutter opening modification amount, for example a shutter opening per HP (%). Higher engine output power generates more underhood heat. Hence the generated or selected shutter modification amount is sized to assist cooling. The function in the engine speed or engine torque request table 83 within engine speed or engine torque sub-control module 84 may be similar to the function within the air conditioning system request table 80 for the AC head pressure.

In one embodiment, a fan speed sub-control module 91 directs a shutter opening modification amount based on fan speed and a fan speed request table 90. The fan speed sub-control module 91 utilizes the fan speed request table 90 with the fan speed from the fan speed sensor 66 to determine a shutter opening modification amount. For example, at low fan speed, the cooling requirement is minimum and could be achieved with a closed or almost closed shutter. As the fan speed increases, the required cooling efforts of the fan increase. The shutter modification amount increases to meet the demand. At high fan speed, the fan speed request table 90 has functions/data corresponding to fully or almost open modification amounts for the shutter 14.

Embodiments of the present disclosure include determining a desired shutter opening amount based on a plurality of sensors and/or modules, such as those discussed above. Further, some data from the sensors and/or modules may have more influence (e.g. may be weighted) to determine the desired opening amount. The following provide exemplary embodiments of methods for determining the desired shutter opening amount.

In one embodiment, outputs of the vehicle speed and ambient temperature sub-control modules 71, 73 are multiplied by a combination module 100. The outputs of the vehicle speed and ambient temperature sub-control modules 71, 73 may be referred to as the vehicle speed modifier to the shutter opening amount and the ambient temperature modifier to the shutter opening amount. The output of the combination module 100 is provided to another combination module 102. A selection module 104 provides a second input to the combination module 102, which multiplies the values from the selection module 104 and the combination module 100. In another exemplary embodiment, any of the values from the selection module 104 and the combination module 100 may be weighted. In this exemplary embodiment, selection module 104 selects a maximum modification amount for the shutter 14 from various sub-control modules. For example, the output of the engine sub-control module 77, the output of the transmission sub-control module 79, the output of the AC sub-control module 81, and the output of the engine speed and torque sub-control module 84 are directed to the selection module 104. The selection module 104 selects from among the modification amounts and selects the highest modification amount for the opening of the shutter 14. Selection of the highest modification amount prevents damage to more sensitive vehicle components from higher temperatures.

The combination module 102 provides the combined value from the selection module 104 and the combination module 100 to another selection module 110. The selection module 110 selects the maximum value from those input to it for the opening amount of the shutter 14. The second input to the selection module 110 is provided by the fan speed sub-control module 91. The selection module 110 selects the maximum modification amount for the shutter 14 from between the output of the fan speed sub-control module 91 and the output of the combination module 102. The selection module 110 then outputs to the actuator 16 a desired shutter position modification amount. The actuator 16 actuates the shutter 14 according to the desired shutter position modification amount. In an alternative embodiment, a single selection module can be configured to determine an opening amount for the shutter 14 based on an input from any combination of sensors and/or modules shown in FIG. 3. In another embodiment, a sensor is included, to monitor for example a vehicle component/system/environment operating temperature, pressure, fluid level, etc., such that when the shutter control system detects data from that particular sensor that is at or exceeds a predetermined threshold value, the shutter control module then directs actuation of the shutter to a predetermined shutter opening value, e.g. a full open position.

Data from various sensors and/or modules shown in FIG. 3 can be weighted. For example, values of the request or look-up tables can be set between 0 and 100 percent. In an alternative embodiment, the request tables are set to a value larger than 100 percent to enforce the full opening of the shutter regardless of vehicle speed and ambient temperature. In other words, the outputs of the request tables may be weighted by adjusting individual request tables to have a completely open shutter at a value great than 100 percent. For example, the engine temperature request table 74 may indicate a 105 percent value for opening of the shutter 14. This percentage value will be the maximum opening percentage value input into the selection module 104. Therefore, 105 percent will be selected by the selection module 104 as a modification amount. In this manner, the vehicle engine temperature may be maintained within a predetermined range and not reach a temperature that will damage the engine, transmission, radiator, electrical systems or other vehicle components or systems.

In one exemplary embodiment, the shutter control module can be a controller configured to direct or perform various operations (including algorithms) described herein as performed by sub-modules.

Figure 4:
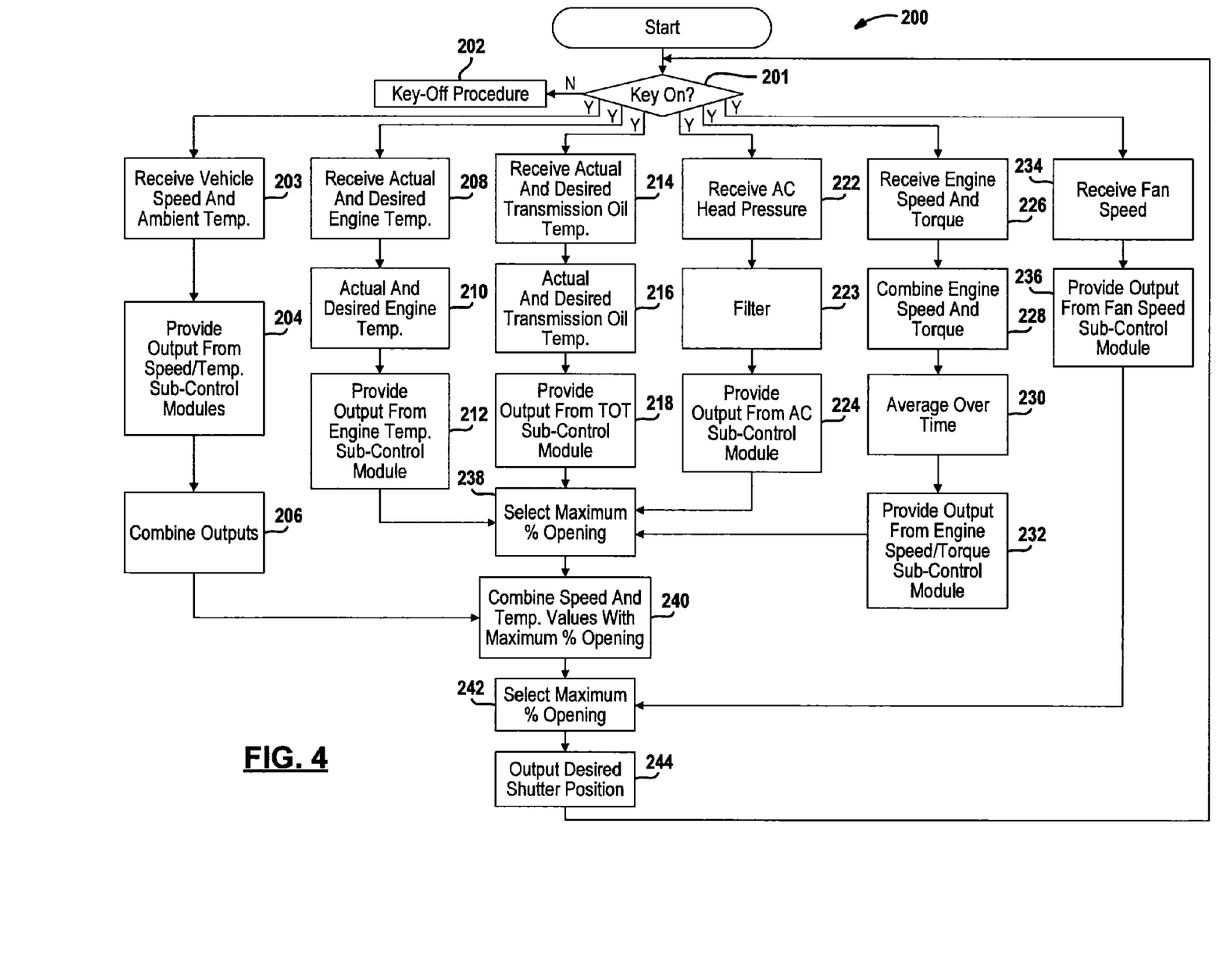
FIG. 4 is a logic flow diagram illustrating a method for operating the shutter control system, according to the present disclosure.

Referring now to FIG. 4, a logic flow diagram 200 illustrating a method for operating the shutter control system is illustrated. While in the discussion below temperature is used to provide an example of data being provided from a sensor or module, etc. for determination of a shutter opening amount, it is to be understood that other types of data can also be conveyed like pressure, fluid level, electrical and power levels, etc. for use in determining shutter opening.

Control starts in step 201 when a key is turned to the "on" position. The method may continuously monitor vehicle systems while the key is in the on position. Further, in step 202 when the key is turned to the off position, the method may provide at least one final shutter position based on sensor signals and/or module inputs in a key-off procedure. For example during a key-off procedure, if a vehicle component temperature is above a threshold, the method can include directing the actuator to open the shutt14 to 100 percent opening. Alternatively, if a vehicle component temperature is within the threshold, the method can open the shutter 14 to 50 percent opening. Alternatively, if vehicle a vehicle component temperature is below the threshold, the method can completely close the shutter 14.

If the key is in the on position, in step 203 vehicle speed and ambient temperature are received. In step 204, the vehicle speed and ambient temperature sub-control modules 70, 72 provide outputs that indicate the needed modification to the nominal shutter opening percentage value based on the vehicle speed and ambient temperature. In step 206 the outputs are combined in combination module 100. In step 208 actual and desired engine temperature are received. In step 210 the difference between desired and actual engine temperatures is calculated. In step 212 the engine temperature sub-control module 77 provides a shutter opening modification amount.

In step 214 actual and desired transmission oil temperature are received. In step 216 the difference between desired and actual transmission oil temperatures is calculated. In step 218 the transmission oil temperature (TOT) sub-control module 79 provides shutter opening modification amounts based on the actual and desired transmission oil temperature.

In step 222 the AC head pressure is received. In step 223 a value for the AC head pressure is filtered. In step 224 the AC sub-control module 81 provides an output based on the filtered AC head pressure. In step 226 the engine speed and torque are received. In step 228 the engine speed and torque are combined to produce engine output power in combination module 86. In step 230 the calculated engine power is averaged over time. In step 232 the engine speed and engine torque sub-control module 84 provides an output based on the averaged engine output power.

In step 234 the fan speed is received. In step 236 the fan speed sub-control module 91 provides a shutter opening modification amount based on the fan speed. In step 238 the maximum value of the outputs of various sub-control modules is generated. For example, outputs of sub-control modules 77, 79, 81 and 84 may be analyzed, and the maximum opening modification amount for the shutter is selected from those sub-control module outputs. In step 240 the combined outputs from step 206 and the maximum opening modification amount from step 238 are combined in combination module 102. The combination module provides an opening modification amount for the shutter 14. In step 242 the combination from step 240 and the output of the sub-control module from step 236 are analyzed and the maximum opening modification amount is selected from the two. In step 244 the desired shutter position is output to control the shutter 14 based on the selection from step 242.

The description of the invention is merely exemplary in nature and, thus, variations that do not depart from the gist of the invention are intended to be within the scope of the inven-

What is claimed is:

1. A vehicle system comprising:
a plurality of sensors that provides a first data indicating vehicle speed, a second data indicating ambient temperature, a third data indicating a first vehicle component condition, a fourth data indicating a first engine condition, and a fifth data indicating a second engine condition; and
a shutter control module comprising:
a plurality of sub-control modules that provide a first amount of modification to an opening amount for a shutter based on the first data, a second amount of modification to the opening amount based on the second data, and a third amount of modification to the opening amount based on the third data;
a first combination module that multiplies together the first and second amounts of modification to provide a first combined amount of modification to the opening amount;
a second combination module that multiplies together the fourth and fifth data to provide an estimated engine output power, the shutter control module configured to determine a fourth amount of modification to the opening amount as a function of the estimated engine output power; and
a first selection module that selects a first maximum value of the third amount of modification and the fourth amount of modification to provide a first maximum amount of modification;
wherein the shutter control module determines the opening amount for the shutter based on at least combining, in a third combination module, the selected first maximum amount of modification and the first combined amount of modification.

2. The vehicle system of claim 1, wherein one of the plurality of sub-control modules comprises a first request table utilized for the first amount of modification to the opening amount for the shutter based on the vehicle speed.

3. The vehicle system of claim 1, further comprising one of the plurality of sensors providing a sixth data that indicates fan speed, wherein one of the plurality of sub-control modules provides a fifth amount of modification to the opening amount for the shutter based on the fan speed, the vehicle system further comprising a second selection module that selects a second maximum value from between the combined first maximum and first combined amounts of modification and the fifth amount of modification, wherein the shutter control module controls the opening amount of the shutter based on the second maximum value.

4. The vehicle system of claim 3, wherein the first vehicle component condition comprises at least one of actual engine temperature, actual transmission oil temperature, and actual air conditioning head pressure.

5. The vehicle system of claim 4, wherein one of the plurality of sensors provides a seventh data indicating a second vehicle component condition, wherein the shutter control module further comprises one of the plurality of sub-control modules providing a sixth amount of modification to the opening amount for the shutter based on the seventh data, and wherein the first selection module selects the first maximum value from the third, fourth and sixth amounts of modification.

6. The vehicle system of claim 5, wherein one of the plurality of sub-control modules receives a first difference of the actual engine temperature and a desired engine temperature from an engine control module, wherein the third amount of modification is based on the difference, wherein one of the plurality of sub-control modules receives a second difference of the actual transmission oil temperature and a desired transmission oil temperature from a transmission control module, and wherein the sixth amount of modification is based on the second difference.

7. The vehicle system of claim 6, further comprising one of the plurality of sensors providing an eighth data indicating a third vehicle component condition, wherein the shutter control module further comprises one of the plurality of sub-control modules providing a seventh amount of modification of the opening amount for the shutter based on the eighth data, wherein the first selection module selects the first maximum value from the third, fourth, sixth and seventh amounts of modification.

8. The vehicle system of claim 7, wherein the fourth amount of modification to the opening amount is a function of the estimated engine output power averaged over time, and wherein the first engine condition comprises engine speed, and wherein the second engine condition comprises engine torque.

9. A method for operating a vehicle system comprising:
providing, from a plurality of sensors, a first data indicating vehicle speed, a second data indicating ambient temperature, a third data indicating a first vehicle component condition, a fourth data indicating a first engine condition, and a fifth data indicating a second engine condition;
receiving, at a shutter control module, the first, second, third, fourth and fifth data;
providing, from a plurality of sub-control modules of the shutter control module, a first modification amount to an opening amount for a shutter based on the first data, a second modification amount to the opening amount based on the second data, and a third modification amount to the opening amount based on the third data;
combining, at a first combination module of the shutter control module, the first and second modification amounts to determine a first combined modification amount to the opening amount;
combining, at a second combination module of the shutter control module, the fourth and fifth data to provide an estimated engine output power, the shutter control module configured to determine a fourth modification amount to the opening amount as a function of the estimated engine output power;
selecting, at a first selection module of the shutter control module, a first maximum value of the third modification amount and the fourth modification amount to provide a selected first maximum modification amount to the opening amount; and
determining the opening amount for the shutter based on at least combining, in a third combination module of the shutter control module, the selected first maximum modification amount and the first combined modification amount;
controlling the opening amount for the shutter to one of an open position, a closed position or a partially open position based on the determined opening amount.

10. The method of claim 9, further comprising:
providing, from one of the plurality of sensors, a sixth data that indicates fan speed;
providing a fifth modification amount from one of the plurality of sub-control modules to the opening amount for the shutter based on the fan speed;

selecting, at a second selection module, a second maximum value from between the combined first selected maximum modification and first combined modification amounts and the fifth modification amount; and controlling the opening amount for the shutter based on the second maximum value.

11. The method of claim 10, wherein the first vehicle component condition comprises at least one of actual engine temperature, actual transmission oil temperature, and actual air conditioning head pressure.

12. The method of claim 11, further comprising:

providing seventh data from one of the plurality of sensors indicating a second vehicle component condition;

providing a sixth modification amount from one of the plurality of sub-control modules to the opening amount for the shutter based on the seventh data; and selecting the first maximum value from the third, fourth and sixth modification amounts.

13. The method of claim 12, further comprising:

receiving a first difference of the actual engine temperature and a desired engine temperature from an engine control module, wherein the third modification amount is based on the first difference;

receiving a second difference of the actual transmission oil temperature and a desired transmission oil temperature from a transmission control module, wherein the sixth modification amount is based on the second difference.

14. The method of claim 13, further comprising:

providing eighth data from one of the plurality of sensors indicating a third vehicle component condition;

providing a seventh modification amount from one of the plurality of sub-control modules to the opening amount for the shutter based on the eighth data; and selecting the first maximum value from the third, fourth, sixth and seventh modification amounts.

15. The method of claim 14, further comprising:

providing the fourth modification amount based on the estimated engine output power averaged over time, wherein the first engine condition comprises engine speed, and wherein the second engine condition comprises engine torque.

\* \* \* \* \*